United States Patent [19]

Bearden, Jr. et al.

[11] Patent Number: 4,557,822
[45] Date of Patent: Dec. 10, 1985

[54] HYDROCONVERSION PROCESS

[75] Inventors: Roby Bearden, Jr.; Clyde L. Aldridge, both of Baton Rouge, La.

[73] Assignee: Exxon Research and Engineering Co., Florham Park, N.J.

[21] Appl. No.: 453,529

[22] Filed: Dec. 27, 1982

[51] Int. Cl.⁴ .......................... C10G 1/06; C10G 47/10
[52] U.S. Cl. ..................................... 208/112; 208/108; 208/10
[58] Field of Search ........................ 208/108, 112, 10

[56] References Cited

U.S. PATENT DOCUMENTS

| | | | |
|---|---|---|---|
| 3,775,286 | 11/1973 | Mukherjee et al. | 208/10 |
| 4,066,530 | 1/1978 | Aldridge et al. | 208/112 |
| 4,094,765 | 6/1978 | Bearden, Jr. et al. | 208/8 |
| 4,111,787 | 9/1978 | Aldridge et al. | 208/10 |
| 4,149,959 | 4/1979 | Bearden, Jr. et al. | 208/8 |
| 4,214,977 | 7/1980 | Ranganathan et al. | 208/10 |
| 4,279,736 | 7/1981 | Gleim | 208/215 |
| 4,298,454 | 11/1981 | Aldridge et al. | 208/108 |
| 4,299,685 | 11/1981 | Khulbe et al. | 208/10 |
| 4,313,818 | 2/1982 | Aldridge et al. | 208/112 |
| 4,374,016 | 2/1983 | Tarrer et al. | 208/10 |
| 4,376,695 | 3/1983 | Belinko et al. | 208/10 |
| 4,394,248 | 7/1983 | Gatsis | 208/10 |

FOREIGN PATENT DOCUMENTS 56-136887 3/1980 Japan.

Primary Examiner—D. E. Gantz
Assistant Examiner—Lance Johnson
Attorney, Agent, or Firm—Marthe L. Gibbons

[57] ABSTRACT

A process for the conversion of a hydrocarbonaceous oil in the presence of hydrogen and an iron-coal catalyst is provided in which a slurry of catalyst in the oil is treated with a hydrogen sulfide-containing gas at specified conditions prior to subjecting the slurry to hydroconversion conditions.

10 Claims, 1 Drawing Figure

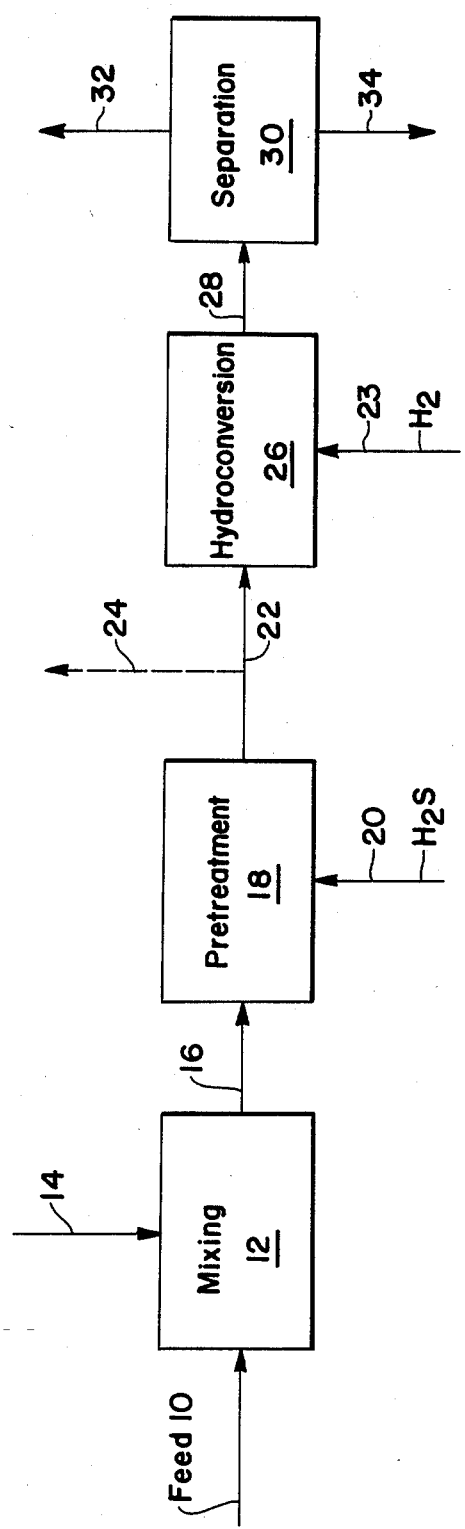

4,557,822

HYDROCONVERSION PROCESS

BACKGROUND OF THE INVENTION

1. Field of the Invention

The present invention relates to an improvement in a process for conversion of hydrocarbonaceous oils in the presence of hydrogen and an iron-coal catalyst.

2. Description of the Prior Art

Hydroconversion processes conducted in the presence of hydrogen and an iron-coal catalyst are known. See, for example, U.S. Pat. No. 4,214,977, the teachings of which are hereby incorporated by reference.

U.S. Pat. No. 4,066,530 discloses a slurry hydroconversion process in which an oil soluble metal compound and an iron component in a heavy hydrocarbonaceous oil are pretreated at a temperature ranging from 325° C. to 415° C. with a gas comprising hydrogen and hydrogen sulfide, see column 4, lines 17 to 31.

U.S. Pat. No. 4,279,736 discloses a titanium sulfide catalyst that may be deposited on high surface area coke which is obtained from low temperature coking of brown coal or lignite in a slurry hydrorefining process in a hydrogen sulfide-containing hydrogen atmosphere.

U.S. Pat. Nos. 4,094,765 and 4,149,959 disclose pretreatment of a mixture of coal and hydrogen donor diluent with hydrogen sulfide prior to subjecting the mixture to coal liquefaction conditions.

It has now been found that pretreatment of a slurry comprising a heavy oil and an iron-coal catalyst will provide advantages that will become apparent in the ensuing description.

SUMMARY OF THE INVENTION

In accordance with the invention there is provided, in a hydroconversion process wherein a slurry comprising a hydrocarbonaceous oil and an iron-coal catalyst is contacted with a hydrogen-containing gas in a hydroconversion zone at hydroconversion conditions to produce a hydroconverted oil, the improvement which comprises pretreating said slurry with a hydrogen sulfide-containing gas at a temperature below 750° F. for a period of time ranging from 30 seconds to 2 hours prior to subjecting said slurry to said hydroconversion conditions.

BRIEF DESCRIPTION OF THE DRAWING

The FIGURE is a schematic flow plan of one embodiment of the invention.

The process of the invention is generally applicable for the hydroconversion of hydrocarbonaceous oils, such as heavy hydrocarbonaceous oils having constituents boiling above 1050° F. All boiling points referred to herein are equivalent atmospheric pressure boiling points unless otherwise specified. Suitable hydrocarbonaceous oils include heavy mineral oil; whole or topped petroleum crude oils, including heavy crude oils; asphaltenes; residual oils having initial boiling points ranging from about 650° to about 1050° F., such as atmospheric residua boiling above 650 and vacuum residua boiling above 1050° F.; tar; bitumen; tar sand oil; shale oil; hydrocarbonaceous oils derived from coal liquefaction processes, including coal liquefaction bottoms, and mixtures thereof. The Conradson carbon residue of such oils will generally be at least 2, preferably at least 5 weight percent and may range up to 50 weight percent or more. As to Conradson carbon residue, see ASTM Test D 189-65. The process is particularly well suited to hydroconvert heavy crude oils and residual oils which generally contain a high content of metallic contaminants (nickel, iron, vanadium) usually present in the form of organo-metallic compounds and a high content of sulfur and nitrogen compounds and a high Conradson carbon residue. Preferably the feed is a heavy hydrocarbonaceous oil having at least 10 weight percent materials boiling above 1050° F., more preferably having at least 25 weight percent materials boiling above 1050° F.

Referring to the FIGURE, a hydrocarbonaceous oil feed is introduced by line 10 into mixing zone 12. An iron-coal catalyst is introduced into mixing zone 12 by line 14 to disperse the catalyst in the oil feed. Suitable iron-coal catalysts are described, for example, in U.S. Pat. No. 4,214,977 where it is shown that the iron compounds used to composite with the coal may be an iron compound convertible into iron sulfide from the action of hydrogen and hydrogen sulfide. The iron compounds may be an iron oxide, an iron salt such as a sulfate, sulfite, chloride, nitrate, oxalate, carbonate or iron hydroxide. A preferred compound is iron sulfate. The coal may be any rank of coal, preferably lignite or subbituminous coal. The catalyst is added to the oil feed in an amount ranging from 0.1 to 5 weight percent, preferably at least 1 weight percent, based on the hydrocarbonaceous oil feed. The slurry of catalysts in oil formed in mixing zone 12 is removed by line 16 and passed to pretreatment zone 18. A hydrogen sulfide-containing gas is introduced via line 20 into pretreatment zone 18. The gas may be pure hydrogen sulfide or a gaseous mixture comprising hydrogen sulfide. When a gaseous mixture is used, preferably the gaseous mixture also comprises hydrogen. Suitable concentration of hydrogen sulfide in the gaseous mixture ranges from about 1 to 99 mole percent, preferably from 2 to 50 mole percent, more preferably from 3 to 30 mole percent. Suitable hydrogen sulfide-containing gases include refinery off-gases comprising light hydrocarbons, recycle hydrogen streams containing $H_2S$, etc. It is to be understood that the hydrogen sulfide-containing gas could be introduced into slurry line 16 and, therefore, introduced into pretreatment zone 18 in admixture with the oil-catalyst slurry. Pretreatment zone 18 is maintained at a temperature below about 750° F., preferably at a temperature ranging from 650° F. to 750° F., more preferably from about 700° to 745° F. and at a pressure ranging from atmospheric pressure to 5000 psig, preferably from about 100 to 3000 psig, for a period of time ranging from about 30 seconds to 2 hours, preferably from 2 to 60 minutes. The effluent of the pretreatment zone 18, which comprises the pretreated slurry of oil and iron-coal catalyst as well as a gaseous phase comprising hydrogen sulfide is passed by line 22 to hydroconversion zone 26. If desired, the gaseous phase may be separated from the pretreated oil phase and removed by line 24 prior to passing the pretreated effluent into hydroconversion zone 26. Instead of mixing the entire amount of oil feed and catalyst in the mixing zone, and then treating the entire slurry, the iron-coal catalyst may be mixed with a small amount of a hydrocarbon oil to form a concentrated slurry. The concentrated slurry is then pretreated with hydrogen sulfide-containing gas. The hydrocarbon oil used in forming the concentrate may be a small portion of the process oil feed or a portion of the crude oil having a lower initial boiling point than the oil feed. Suitable amounts of oil to be used to form the concentrate range from 2 to 50 weight percent of the total oil feed, more preferably 3 to 10 weight percent of the total oil feed. In this embodiment, the pretreated concentrate is then added to the oil feed (carried in line 22). A molecular hydrogen-containing gas may be introduced via line 23 into hydroconversion zone 26 (or into line 22) if there is insufficient hydrogen in the pretreated effluent to provide the desired hydrogen partial pressure in hydroconversion zone 26. The hydrogen-containing gas may be pure hydrogen but will generally be a hydrogen-containing gas recovered from hydroprocessing, as is well-known in the art. Hydroconversion zone 26 is maintained at a temperature ranging from about 760° to about 900° F., preferably from about 800° to 850° F. and at a hydrogen partial pressure ranging from about 500 to about 5000 psig, preferably from about 1000 to about 3000 psig. The contact time in the hydroconversion zone may vary widely depending on the desired level of conversion. Suitable liquid feed space velocities may range broadly from about 0.01 to 4 volumes of feed per volume of reactor per hour (V/V/HR), preferably from about 0.05 to 1 V/V/HR, more preferably from about 0.1 to 0.4 V/V/HR. The mixed phase effluent of hydroconversion zone 26 is removed by line 28 and passed to separation zone 30 where it is separated by conventional means into a predominantly vaporous phase comprising light, normally gaseous hydrocarbons and hydrogen removed by line 32 and a principally liquid phase removed by line 34. The vaporous phase may be separated by conventional means to obtain a hydrogen-rich gas, which, if desired, may be recycled to the process. The normally liquid hydrocarbon phase, i.e., hydroconverted oil product, may be separated into fractions as is well-known in the art. If desired, at least a portion of these fractions, including the heavy bottoms fraction comprising the catalyst, may be recycled to the hydroconversion zone. Furthermore, if desired, the catalyst may be separated from the oil product and recycled to the hydroconversion zone.

The following example is presented to illustrate the invention.

EXAMPLE

The iron-coal catalyst used in this study was prepared by impregnating a Canadian subbituminous coal with aqueous ferrous sulfate according to the procedure described in Example 1 of U.S. Pat. No. 4,214,977. The finished catalyst, which was passed through a 100 mesh (Tyler) screen prior to use, contained 25.3 wt. % FeSO$_4$.H$_2$O and 74.7 wt. % coal. The residuum feestock was an Athabasca bitumen having an initial boiling point of 850° F. and a Conradson carbon content of 20 wt. %.

In carrying out the experiments, which consisted of a pretreatment step followed by a hydroconversion step, a 300 cc stirred autoclave reactor was first charged with 100 g of catalyst-residuum slurry comprising 3 wt. % of the iron-coal catalyst and 97 wt. % of the Athabasca bitumen feed. The reactor was then charged with hydrogen or with a blend of hydrogen and hydrogen sulfide (see Table I) and heated to a selected pretreatment temperature where it was held for a designated time at 1500 psi total pressure with no flow of gas through the reactor. Upon completion of the pretreatment step, reactor temperature was increased to a hydroconversion temperature of 830° F., a flow of hydrogen was started through the reactor, and a hydroconversion run of 3 hours duration was carried out at 1500 psi total pressure while maintaining a gas flow (measured at reactor outlet) of ~0.5 liter/min.

In the course of the hydroconversion step, approximately 30 wt. % of oil feed charged was distilled from the reactor in the form of 650−° F. liquid and gaseous products, which products were collected and analyzed. The 650+° F. products (along with some 650−° F. liquids) which remained in the reactor after the reaction was completed, were mixed with three weights of toluene, based on the weight of residuum feed charged initially, and then filtered to recover toluene insoluble residues, which are designated as toluene insoluble coke, and a solids free oil product, which was analyzed for Conradson carbon content after removal of the bulk of the toluene diluent. The results of these experiments are summarized in Table I.

TABLE I

PRETREATMENT WITH H$_2$ + H$_2$S
IMPROVES IRON-COAL CATALYST ACTIVITY

Feed: 850+° F. Athabasca Bitumen
Catalyst: FeSO$_4$—on-subbituminous coal consisting of
25.3 wt. % FeSO$_4$.H$_2$O with 74.7 wt. % coal
Catalyst Concentration on Feed: 3.1 wt. %
Pretreatment Conditions: See Table
Hydroconversion Conditions: 3 Hr., 830° F., 1500 psig,
H$_2$ flow-through

| Run No. | R-1066 | R-1074 | R-1068 | R-1069 |
|---|---|---|---|---|
| Mole % H$_2$S in H$_2$ charged to reactor for pretreatment step | 0 | 5.5 | 0 | 5.5 |
| Pretreat Conditions | | | | |
| Time, Min. | 7 | 7 | 30 | 30 |
| Temp., °F. | 740 (Avg.) | 740 (Avg.) | 725 | 725 |
| Yield of Toluene Insoluble Coke, wt. % on Residuum Feed | 11.6 | 3.4 | 7.1 | 3.3 |
| Conradson Carbon Conversion to Non-Coke Products, % | 15.5 | 45.2 | 26.9 | 45.7 |

As can be seen from the data in Table I, Experiments No. R-1074 and R-1069, which were experiments in accordance with the invention, in which a slurry of oil plus catalyst was pretreated with a hydrogen sulfide and hydrogen-containing gas gave a greater conversion of Conradson carbon materials and lower yield of toluene insoluble cake than experiments R-1066 and R-1068 in which hydrogen sulfide was omitted and which experiments were not in accordance with the present invention.

What is claimed is:

1. In a hydroconversion process wherein a slurry comprising a hydrocarbonaceous oil and an iron-coal catalyst is contacted with a hydrogen-containing gas in a hydroconversion zone at hydroconversion conditions to convert at least a portion of said oil to lower boiling products and thereby produce a hydroconverted oil, said iron-coal catalyst being present in said slurry in an amount ranging from about 0.1 to 5 weight percent, based on said oil, the improvement which comprises pretreating said slurry with a substantially pure hydrogen sulfide or with a gaseous mixture comprising from about 1 to about 99 mole percent hydrogen sulfide, at a temperature below about 750° F., for a period of time ranging from about 30 seconds to 2 hours prior to subjecting said slurry to said hydroconversion conditions, including a temperature greater than said pretreatment temperature.

2. The process of claim 1 wherein said slurry is pretreated at a temperature ranging from about 650° F. to about 750° F.

3. The process of claim 1 wherein said gaseous mixture also comprises hydrogen.

4. The process of claim 1 wherein said pretreatment is conducted at a pressure ranging from about atmospheric pressure to 5000 psig.

5. The process of claim 1 wherein said catalyst comprises an iron compound convertible to iron sulfide by reaction with hydrogen sulfide.

6. The process of claim 1 wherein said hydroconversion conditions include a hydrogen partial pressure ranging from about 500 to about 5000 psig.

7. The process of claim 1 wherein the space velocity of said slurry is said hydroconversion zone ranges from 0.05 to 1 volumes of slurry per hour per volume of hydroconversion zone.

8. The process of claim 1 wherein said catalyst comprises iron sulfate.

9. The process of claim 1 wherein said slurry is pretreated at a temperature ranging from 700° to 745° F.

10. The process of claim 1 wherein said hydroconversion conditions include a temperature ranging from about 760° to about 900° F.

* * * * *